UNITED STATES PATENT OFFICE.

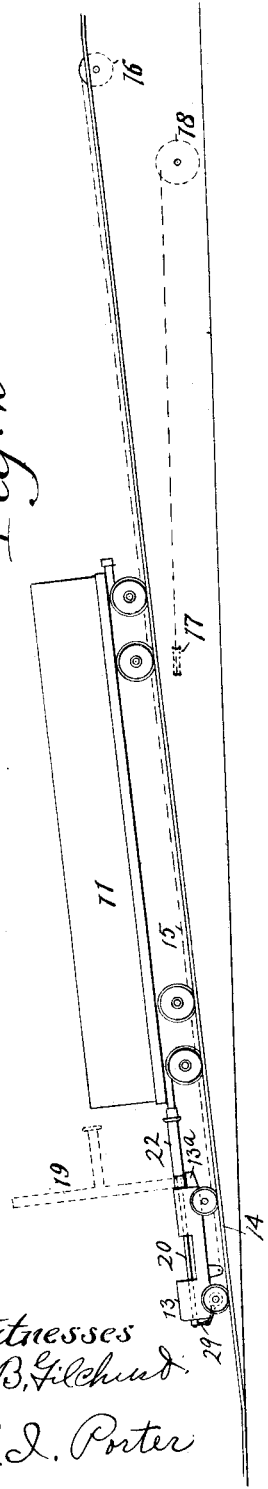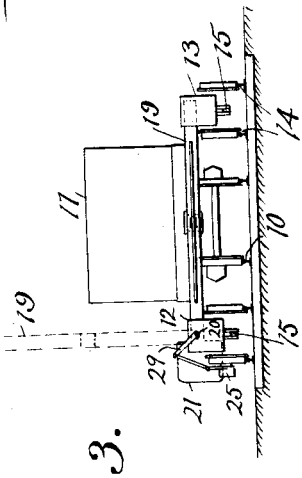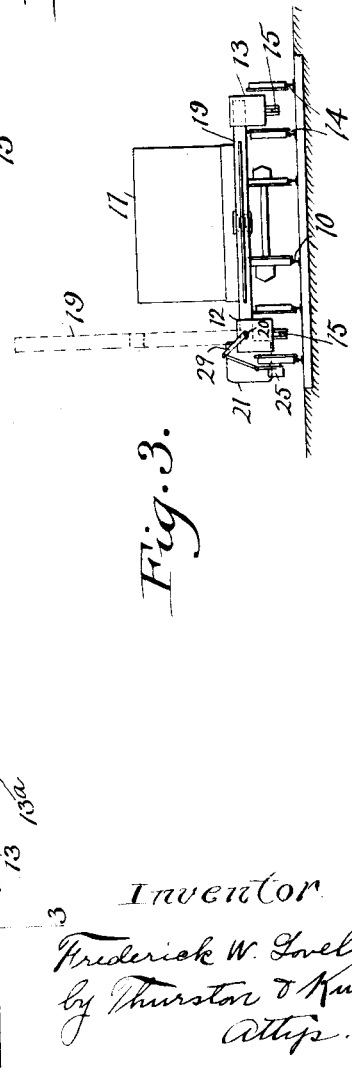

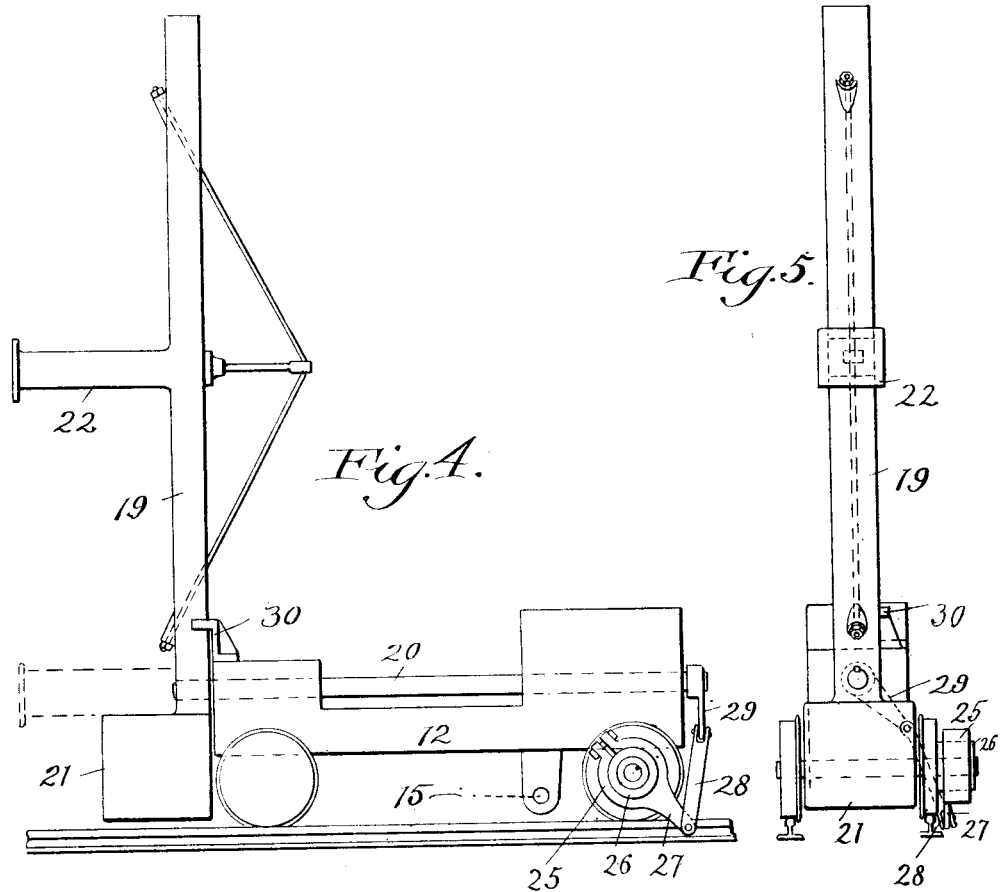

FREDERICK W. LOVELL, OF CLEVELAND, OHIO, ASSIGNOR TO THE McMYLER INTERSTATE COMPANY, OF BEDFORD, OHIO, A CORPORATION OF OHIO.

CAR-HAULAGE SYSTEM.

1,125,355.  Specification of Letters Patent.  Patented Jan. 19, 1915.

Application filed June 22, 1914. Serial No. 846,462.

*To all whom it may concern:*

Be it known that I, FREDERICK W. LOVELL, a citizen of the United States, residing at Cleveland, in the county of Cuyahoga and State of Ohio, have invented a certain new and useful Improvement in Car-Haulage Systems, of which the following is a full, clear, and exact description.

This invention relates to haulage car plants or systems adapted to be employed in connection with car handling apparatus, such as car dumpers which require a haulage system to bring the loaded cars up on to the dumper cradle and generally up along an inclined approach track leading thereto.

Car dumpers are usually provided with a haulage plant including a small haulage car which runs along a narrow gage track between the rails of the main track. This haulage car track terminates in a pit into which the haulage car is adapted to be lowered so that a loaded car can be "spotted" or brought up to position such that when the haulage car is drawn from the pit by the haulage cables it will be at the rear of the loaded car or in position to pull the same up the inclined approach to the car dumper. A haulage plant of this type has the disadvantage that it is necessary that the haulage car be in the pit before the loaded car is spotted. This is particularly disadvantageous with some track lay-outs associated with car dumpers, because in spotting the loaded cars, they must be brought from some distance and are usually allowed to drift down an inclined track to a point beyond the pit of the haulage plant. To avoid danger of collision with the haulage car, it is generally inadvisable to start the cars down the incline toward the dumper until after the haulage car is in the pit, especially as it is sometimes difficult or not possible to stop the cars in their descent. The above mentioned disadvantages of the haulage plants generally employed are overcome by my invention, which permits the spotting of the car to be handled regardless of the position or location of the haulage car, or admits of the haulage car being moved down the approach to the dumper or other car handling apparatus regardless of whether or not a loaded car is in position on the track to be shifted by the haulage car.

This improved haulage system includes a haulage car which runs on a track at the side of the main track and which is provided with a movable shifter member, which when the haulage car is passing down the incline or away from the car handling apparatus, is in a position such that it will not engage a car which happens to be on the main track, but when pulled in the other direction, *i. e.* toward the car handling apparatus, is shifted to a position such that it will engage the desired part of the main or loaded car. In the preferred embodiment of my invention, this shifter member is adapted to swing from a vertical position to a horizontal position, and vice versa, the shifter member being in a vertical position when the haulage car is going down the incline, and being swung to a horizontal position when the haulage car is moved in the reverse direction. I prefer to use two haulage cars which run on tracks on opposite sides of the main track, one of these haulage cars carrying the shifter member above referred to, and the other being adapted to support its free end when the shifter member is lowered to operative position, the two cars moving simultaneously up or down the tracks.

My invention may be further briefly summarized as consisting in certain novel details of construction and combinations and arrangements of parts which will be described in the specification and set forth in the appended claims.

In the accompanying sheets of drawings, Figure 1 is a plan view of a portion of the main and haulage car tracks leading up to the car dumper or other car handling apparatus. Fig. 2 is a side view of the same. Fig. 3 is a sectional view of the same substantially along the line 3—3 of Fig. 1. Fig. 4 is an enlarged side view of the haulage car with the shifter member elevated or in inoperative position. Fig. 5 is an end view of the same, and Fig. 6 is a top plan view of the same.

In the drawings, wherein I have shown only the preferred embodiment of my invention, 10 represents a portion of the main track along which are adapted to be moved main or loaded cars which are to be shifted by my improved haulage system. The portion of the track which is here shown is the upwardly inclined portion or approach leading to the cradle of a car dumper or other car handling apparatus not shown. The haulage system includes in this case two haulage cars 12 and 13, which are adapted to be run up and down along narrow gage haulage tracks 14 arranged on opposite sides of the main track 10 and in the same or substantially the same plane therewith. These haulage cars are adapted to be pulled up the tracks by haulage cables 15, which are attached to the bodies of the haulage cars and which pass about sheaves 16 located near the upper ends of the haulage car tracks and thence pass about idler sheaves 17 located a distance down the tracks from the sheaves 16, and thence pass forwardly about a drum 18, which is adapted to be operated by a haulage engine. The haulage cars may run down the tracks by gravity, but, if desired, tail ropes may be utilized to pull them down the tracks, as will be readily understood without illustration. The haulage tracks are located close to the main track, but at a sufficient distance therefrom that the haulage cars may run down the haulage tracks and may pass a loaded car which may be standing on the main track in position to be pulled up the approach. One of these haulage cars 12 carries a movable car shifter member 19 which is supported so that it may be swung upward to a position to clear the main car, or downward at the rear of the main car so as to engage an appropriate part of the latter to shift the same. In this instance, this shifter member 19 is in the form of a long arm or beam, which is secured to the end of a substantially horizontally disposed shaft 20 carried by the body of the haulage car 12, and is adapted to be swung upward to a vertical position or to be swung downward so as to extend across to the haulage car 13 on the opposite side of the main track. The shifter member 19 is provided with a counterweight 21, so it can be easily raised or lowered. This member 19 may be formed of any suitable material, such as structural material, and is provided midway between its ends with a forwardly projecting arm 22, which is adapted to engage the bumper of the car 11 in the manner shown in Fig. 1. When the shifter member 19 is lowered to horizontal position, its free end will make suitable connection with the opposite haulage car 13 and in this case said free end is adapted to rest upon a suitable shelf 13ª at the forward end of the car 13, and will engage the forward end of the body of said car, so that as both cars are moved simultaneously up the approach the pulling load will be distributed and will be borne equally by both cars.

The shifter member 19 is preferably automatically moved downward to operative position, or upward to inoperative position, and preferably the movement or position of the arm is controlled by the direction in which the haulage car is moved. This is accomplished by providing suitable means on the car for moving the arm downward to horizontal position when the haulage cars are pulled forward, and for moving the shifter member upward when the haulage cars are run down the inclined tracks. In the embodiment of my invention here shown this mechanism includes a friction device 25 which frictionally engages a drum 26 on the rear axle of the car 12. This friction device 25 has an arm 27, the free end of which is connected by a link 28 to an arm 29 secured to the rear end of shaft 20 to which the shifter member 19 is secured. This mechanism is so arranged that when the cars are pulled forwardly the friction between the parts 25 and 26 causes the members 27, 28 and 29 to rotate the shaft 20 and lower the shifter member 19 to horizontal position, and this mechanism will hold the shifter member in that position until the movement of the haulage cars is reversed, whereupon the friction device through the members connecting it to the shaft 20 will positively elevate the shifter member 19 to vertical position. A suitable stop member 30 may be provided on the car 12 to limit the upward swinging movement of the shifter member 19.

The operation of the haulage system is substantially as follows: The main car 11 may be brought to the base of the car dumper approach at any time, or regardless of the position of the haulage cars. The haulage cars after bringing the car on to the car dumper or other car handling apparatus are then permitted to run down the inclined haulage tracks by gravity or by the tail ropes, if they are required, until the haulage cars are at the rear of the car to be handled, or are beyond the position at which such car will stop when it is being spotted. Thence, the haulage cables are wound on the drum, simultaneously pulling both cars toward the car handling apparatus. This immediately lowers the shifter member 19, so that it extends across the main track at the rear of the main car 11 from one haulage car to the other. Thence, the shifter member engages the car 11, and moves the same up the inclined track 10 until it is deposited onto the receiving member of the car handling apparatus.

It will be observed that by the provision of the two haulage cars which support the shifter member 19 at its ends while engaged in the act of pushing the car up the track, neither of the haulage cars is subjected to any side thrust, as would be the case if a single haulage car were employed at the side of the main car. This is a matter of considerable moment, especially when very heavy cars 11 are to be shifted up very much of a grade. Furthermore, it is not essential that either of the haulage cars be of very great size.

Although I have described the preferred form only of my invention, it will be apparent that numerous modifications may be made, and I do not desire to be confined to any particular form or construction, arrangement, or details, except as I am expressly limited by the terms of the appended claims.

Having thus described my invention, I claim:

1. In a car haulage system, a main track for cars to be handled, a haulage track at the side of the main track, a haulage car on said track, said haulage car having a movable shifter member adapted to be shifted laterally in one direction to a position to engage a car on the main track or in the opposite direction to a position not to engage said car, and means for automatically shifting said member.

2. In a car haulage system, a main track for cars to be handled, a haulage track at the side of the main track, a haulage car on said track, a pivoted shifter member carried by said haulage car, and means for automatically swinging said member to a position to engage a car on the main track or to a position such that it will not engage the car.

3. In a car haulage system, a main track for cars to be handled, a haulage track at the side of the main track, a haulage car on said track, a movable shifter member carried by said haulage car, adapted to be shifted to a position such that it will engage a car on the main track, or to a position such that it will pass the car without engaging the same, and means controlled by the movement of said haulage car for shifting said member.

4. In a car haulage system, a main track for cars to be handled, a haulage track at the side of the same, a haulage car on said haulage track, and means whereby when said haulage car is moved in one direction the shifter member is automatically moved laterally to a position to engage a car on the main track, and when the haulage car is moved in the opposite direction the said shifter member is moved out of car engaging position.

5. In a car haulage system, a main track for cars to be handled, a haulage track at the side of the same, a haulage car on said track, a movable shifter member carried by said haulage car, and friction means controlled by the movement of the haulage car for shifting said member to car engaging position or out of car engaging position.

6. In a car haulage system, a main track for cars to be handled, a haulage track at the side of the same, a haulage car on said track, a shifter member carried by said haulage car, and means controlled by the movement of the car for swinging said shifter member from a substantially vertical position to a substanially horizontal position and vice versa.

7. In a car haulage system, a main track for cars to be handled, a pair of haulage tracks on opposite sides of the main track, haulage cars on said tracks, and means adapted to extend between said haulage cars across the main track for engaging and shifting a car on the main track.

8. In a car haulage system, a main track for cars to be handled, a pair of car haulage tracks on opposite sides of the main track, haulage cars on said tracks, and a shifter member carried by one of said cars and adapted to extend across the main track and engage the other haulage car so that it may shift a car on the main track.

9. In a car haulage system, a main track for cars to be handled, a pair of haulage tracks on opposite sides of the main track, haulage cars on said haulage tracks, a movable shifter member pivotally supported on one of said cars and adapted to be swung to a substantially vertical position or downwardly to a substantially horizontal position so as to engage the other haulage car.

10. In a car haulage system, a main track for cars to be handled, a pair of haulage tracks on opposite sides of the main track, haulage cars on said haulage tracks, a movable shifter member pivotally supported on one of said cars and adapted to be swung to a substantially vertical position or downwardly to a substantially horizontal position so as to engage the other haulage car, and means for simultaneously shifting both haulage cars.

11. In a car haulage system, a main track for cars to be handled, haulage tracks on opposite sides of the main track, haulage cars on said haulage tracks, a movable shifter member carried by one of said cars and adapted to be extended across the main track so as to engage the other haulage car, and means controlled by the movement of said haulage cars for shifting said shifter member.

12. In a car haulage system, a main track for cars to be handled, haulage tracks on opposite sides of the main track, haulage cars on said haulage tracks, a movable shifter member carried by one of said cars and adapted to be extended across the main track so as to engage the other haulage car, means controlled by the movement of said haulage cars for shifting said shifter member, and cables for simultaneously shifting both haulage cars.

In testimony whereof, I hereunto affix my signature in the presence of two witnesses.

FREDERICK W. LOVELL.

Witnesses:
E. B. GILCHRIST,
A. F. KWIS.

Copies of this patent may be obtained for five cents each, by addressing the "Commissioner of Patents, Washington, D. C."